Figure 1:
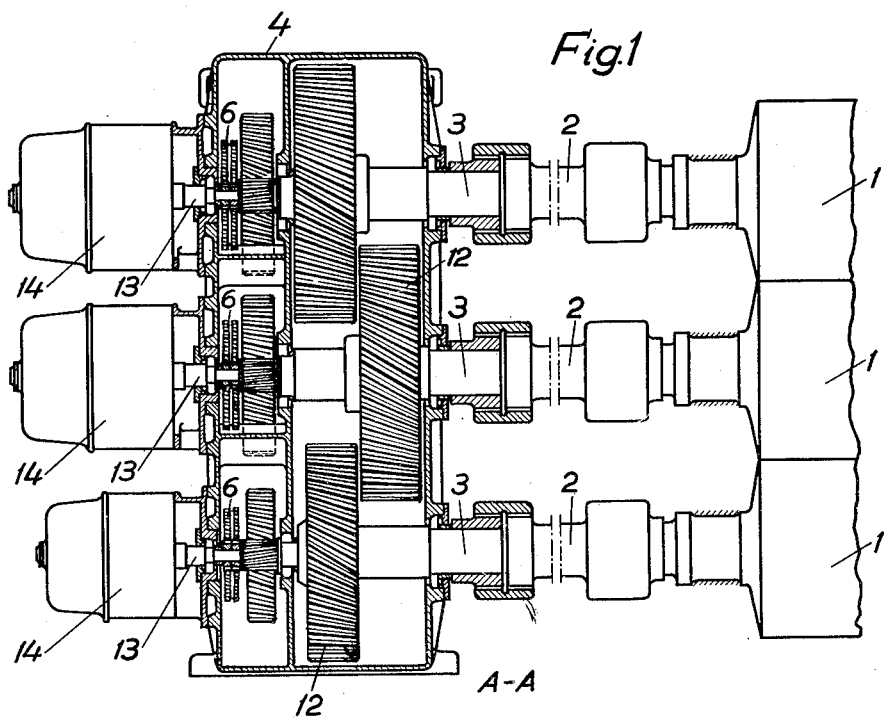

Aug. 28, 1951     F. LANDAU ET AL     2,565,565
CALENDERING DEVICE FOR NATURAL OR SYNTHETIC
RUBBER OR SIMILAR MATERIALS
Filed Nov. 19, 1946     2 Sheets-Sheet 1

Inventors
Frans Landau
and Jonas Georg Norberg
By
Attorney.

Patented Aug. 28, 1951

2,565,565

UNITED STATES PATENT OFFICE 2,565,565

CALENDERING DEVICE FOR NATURAL OR SYNTHETIC RUBBER OR SIMILAR MATERIALS

Frans Landau, Vasteras, and Jonas Georg Norberg, Stockholm, Sweden, assignors to Allmanna Svenska Elektriska Aktiebolaget, Vasteras, Sweden, a Swedish corporation Application November 19, 1946, Serial No. 710,856
In Sweden November 26, 1945

4 Claims. (Cl. 18—2)

In treating rubber in calenders, that is to say in kneading the rubber by milling to thin sheets or milling it together with fabrics it has been necessary to make the rolls of the calenders of slightly convex form with the maximum diameter at the medial portion in order to get an evenly thick product. This convex form is necessary in order to get an equal distance between the rolls along their whole length in spite of their bending out due to the milling pressure.

As long as only natural rubber was treated it was sufficient with only one curving of the rolls, but since during recent years synthetic rubbers have been used to a great extent it has proved necessary to design the curving of the rolls to suit the material to be treated. In order to avoid a regrinding of the rolls according to the material the rolls are set a little obliquely in relation to each other so that there has been a small angle between the axes of the upper and the lower roll with respect to the axis of the middle roll.

When such an oblique arrangement of the rolls is used, however, the transmission of power to such rolls can not take place by coupling them together only by cylindrical gear wheels, because the coaction of the gear teeth would then be bad, due to the oblique position of the gear wheels in relation to each other. It has therefore been necessary to use a gear coupled to the rolls by means of link connections.

It is, however, not always sufficient to be able to vary the oblique setting of the rolls in relation to each other, as in many cases it is also an advantage to be able to give the rolls different speeds and to be able to change the speed ratio between the rolls according to the kind of material to be treated. This is not possible in the arrangement just mentioned, because the relative speed of the rolls is determined once for all by the teeth in the gear.

The present invention has for its object an arrangement in rubber calenders, by which it is possible not only to give the rolls every desired oblique mutual position but also to change individually the speed of each roll. According to the invention the rolls are driven each from its own gear, which gears, however, are built together in a common gear housing, on which the driving motors for the different gears are attached. The transmission of power between the gears and the rolls is effected by means of link couplings. In order that the gear ratio shall be sufficient each gear is provided with at least two intermediary shafts, but the three gears are as above mentioned built together in a common gear housing in order that for a given distance between the rolls the gear wheels may be as large as possible, which is of utmost importance for the limitation of the pressure between the teeth.

Figure 2:
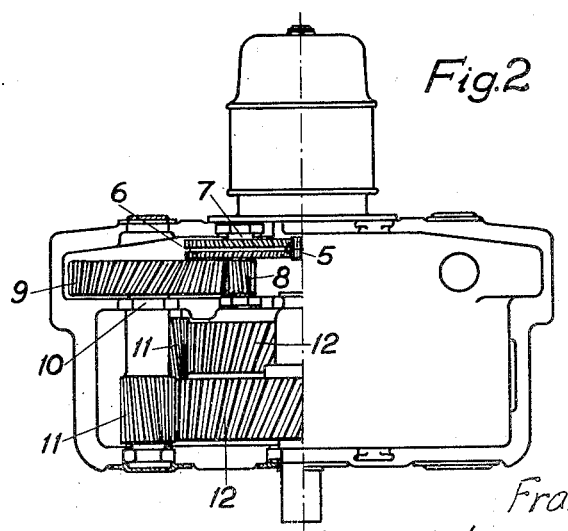
Figure 3:
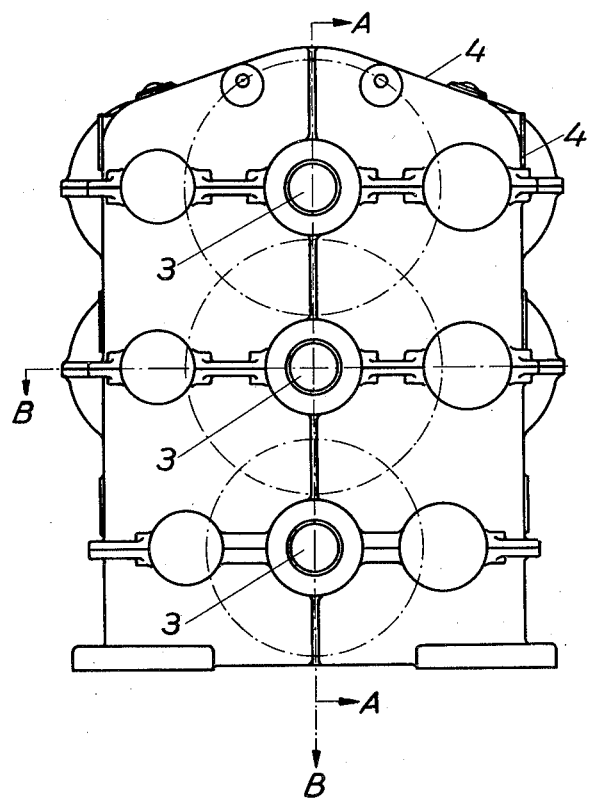

On the accompanying drawing one form of the invention is shown. Fig. 1 is a vertical section through the gear casing along the line A—A of Fig. 3, and Fig. 2 is an horizontal section along the line B—B, whereas Fig. 3 shows the gear casing from the end. In the figures 1 designates the rolls of the calender, which by means of link couplings 2 are coupled to the driven shafts 3 of the different gears. Each gear consists of a pinion 5 meshing with two intermediary gears 6 on intermediary shafts 7. On the shafts 7 carrying the wheels 6 pinions 8 are arranged, which mesh in gear wheels 9 on intermediary shafts 10 also carrying pinions 11 meshing with driven wheels 12. The pinions 5 are attached on the motor shafts 13 of motors 14, which are flanged to the gear housing 4.

In order to allow a large diameter of the driven wheel in each gear at a comparatively small distance between the axes of the rolls 1 the three driven wheels 12 are not arranged in the same plane but are in staggered relation to each other so that the driven wheel in the lowest and highest gear are arranged in one plane, whereas the outgoing wheel in the intermediary gear is arranged in another plane. By this arrangement of the gears the driven wheels can be made so large that even for large torques the teeth pressure will be rather small.

We claim as our invention:

1. Driving mechanism for mills treating rubber and similar material, comprising a gear casing, at least two independent gear means in said casing, and a separate electric motor for driving each gear means, each of said gear means consisting of a pinion driven by one of the electric motors, a low speed gear wheel, a shaft carrying said wheel and coupled to one of the rolls of the mill, and two trains of gear wheels transmitting motion from said pinion to said low speed gear wheel, the two gears at the driven ends of said trains meshing with said low speed gear at opposite points on its circumference.

2. Driving mechanism for mills treating rubber and similar material, comprising an electric motor for driving the shaft of each roll of the mill, a high speed pinion driven by each motor, a low speed gear wheel coupled to each roll shaft, two speed reducing trains transmitting rotary motion from each of said high speed pinions to one of said low speed gear wheels, said speed reducing trains including gears meshing with the low speed gear wheel at opposed points in the circumference of said gear wheel, and a gear casing located at one side of the mill and enclosing all said pinions, low speed gear wheels and gear trains.

3. Driving mechanism for mills treating rubber and similar material, comprising an electric motor for driving the shaft of each roll of the mill, a high speed pinion driven by each motor, a low speed gear wheel coupled to the shaft of each roll, two speed reducing trains transmitting rotary motion from each of said high speed pinions to one of said low speed gear wheels, said speed reducing trains including gears meshing with the high speed pinion at diametrically opposed points therein and including gears meshing with the low speed gear wheel at diametrically opposed points in the circumference thereof, and a common gear casing located at one side of the mill and enclosing all said pinions, low speed gear wheels and gear trains and supporting said electric motors.

4. Driving mechanism for mills treating rubber and similar material, comprising a gear casing at one side of the mill, at least two driving pinions in said casing, an electric motor independently driving each of said pinions, a low speed gear wheel coupled to each roll of the mill and having a diameter greater than the distance between the centers of adjacent rolls, adjacent low speed gear wheels being arranged in the casing in staggered relation to each other, and two trains of speed reducing gears transmitting rotary motion from each driving pinion to a low speed gear wheel and said trains comprising gear wheels meshing with the low speed gear wheels at points spaced from each other in the circumference of said gear wheels.

FRANS LANDAU.
JONAS GEORG NORBERG.

REFERENCES CITED

The following references are of record in the file of this patent:

UNITED STATES PATENTS

| Number | Name | Date |
| --- | --- | --- |
| 1,342,114 | Iddon | June 1, 1920 |
| 1,669,879 | Morris et al. | May 15, 1928 |
| 2,038,783 | Gassen | Apr. 28, 1936 |
| 2,102,355 | Cummins | Dec. 14, 1937 |